US012598652B2

(12) United States Patent
Ohara

(10) Patent No.: US 12,598,652 B2
(45) Date of Patent: Apr. 7, 2026

(54) USER EQUIPMENT AND CONTROL METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 461 days.

(21) Appl. No.: 17/429,528

(22) PCT Filed: Feb. 14, 2019

(86) PCT No.: PCT/JP2019/005454
§ 371 (c)(1),
(2) Date: Aug. 9, 2021

(87) PCT Pub. No.: WO2020/166047
PCT Pub. Date: Aug. 20, 2020

(65) Prior Publication Data
US 2022/0159726 A1 May 19, 2022

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC .................................................. H04W 74/0833
See application file for complete search history.

(56) References Cited

U.S. PATENT DOCUMENTS

| | | | | |
|---|---|---|---|---|
| 11,540,323 B2* | 12/2022 | Xu | .......................... | H04W 52/36 |
| 2018/0279186 A1* | 9/2018 | Park | .................... | H04W 36/302 |
| 2018/0279376 A1 | 9/2018 | Dinan et al. | | |
| 2020/0100297 A1* | 3/2020 | Agiwal | ............... | H04W 52/365 |
| 2020/0146069 A1* | 5/2020 | Chen | .................... | H04B 17/327 |
| 2020/0221504 A1* | 7/2020 | Cirik | .................... | H04L 1/1864 |

FOREIGN PATENT DOCUMENTS

| | | | | |
|---|---|---|---|---|
| JP | 2020-102753 A | 7/2020 | | |
| WO | 2020/129784 A1 | 6/2020 | | |
| WO | WO-202015607 | * | 8/2020 | .......... H04W 72/042 |
| WO | WO-2020156072 | * | 8/2020 | .......... H04W 72/042 |
| WO | WO-2020156072 A1 | * | 8/2020 | ............ H04W 72/23 |

OTHER PUBLICATIONS

Notice of Reasons for Refusal issued in Japanese Application No. 2020-572028 mailed on Sep. 20, 2022 (6 pages).

(Continued)

*Primary Examiner* — Abdeltif Ajid
(74) *Attorney, Agent, or Firm* — Osha Bergman Watanabe & Burton LLP

(57) ABSTRACT

A user equipment includes a receiving unit configured to receive, from a base station apparatus, an instruction designating a method in which a random access procedure is performed, and includes a control unit configured to determine, in accordance with the instruction, whether to execute a random access procedure of a method in which a first message is transmitted using a preamble resource and a PUSCH resource.

5 Claims, 7 Drawing Sheets

(56)　　　　　References Cited

OTHER PUBLICATIONS

International Search Report issued in PCT/JP2019/005454 on May 7, 2019 (3 pages).

Written Opinion of the International Searching Authority issued in PCT/JP2019/005454 on May 7, 2019 (4 pages).

3GPP TS 38.321 V15.4.0; "3rd Generation Partnership Project; Technical Specification Group Radio Access Network; NR; Medium Access Control (MAC) protocol specification (Release 15)"; Dec. 2018 (77 pages).

3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).

Office Action issued in Chinese Application No. 201980091141.X; Dated Sep. 29, 2023 (16 pages).

Office Action issued in Chinese Application No. 201980091141.X; Dated Mar. 30, 2024 (15 pages).

Decision of Rejection issued in Chinese Application No. 201980091141.X, mailed Jul. 29, 2024 (15 pages).

Office Action issued in Australian Application No. 2019429344; Dated Aug. 19, 2024 (3 pages).

* cited by examiner

USER EQUIPMENT AND CONTROL METHOD

TECHNICAL FIELD

The present invention relates to a user equipment in a wireless communication system.

BACKGROUND ART

In 3GPP (3rd Generation Partnership Project), a wireless communication systems referred to as NR (New Radio) or 5G have been studied to achieve higher capacity system, higher data transmission speed, lower delay in radio sections, and the like. In 5G, various wireless technologies and network architectures are being studied in order to satisfy the requirement that the delay of the radio section be 1 ms or less while achieving a throughput of 10 Gbps or more (for example, see Non-Patent Document 1).

PRIOR ART DOCUMENT

Non-Patent Document

Non-Patent Document 1: 3GPP TS 38.300 V15.4.0 (2018-12)
Non-Patent Document 1: 3GPP TS 38.321 V15.4.0 (2018-12)

SUMMARY OF THE INVENTION

Problem to be Solved by the Invention

In NR, a random access procedure similar to LTE is specified (Non-Patent Document 2). Further, in NR, in order to reduce latency and reduce power consumption, a random access procedure with a small number of steps (referred to as two-step RACH) has been started.

However, in two-step RACH, before transmission timing is adjusted with timing advance, data is considered to be transmitted in PUSCH having a short CP length, and therefore, a distance between a base station apparatus and a user equipment in which two-step RACH can be used is limited. There is a problem in that, in that case, when two-step RACH is enabled only in a cell having a maximum cell radius equal to or less than the distance in which two-step RACH can be used, cases where two-step RACH can be used is greatly limited.

The present invention has been made in view of the above issues, and it is an object of the present invention to provide a technique in which a user equipment can determine, without relying on a cell radius, whether to execute a random access procedure having a less number of steps.

Means for Solving Problem

According to the technique of the present disclosure, provided is a user equipment includes a receiving unit configured to receive, from a base station apparatus, an instruction designating a method in which a random access procedure is performed, and includes a control unit configured to determine, in accordance with the instruction, whether to execute a random access procedure of a method in which a first message is transmitted using a preamble resource and a PUSCH resource.

Effect of the Invention

According to the technique of the present disclosure, a technique in which a user equipment can determine, without relying on a cell radius, whether to execute a random access procedure having a less number of steps is provided.

BRIEF DESCRIPTION OF DRAWINGS

FIG. 1 is a drawing for explaining a wireless communication system according to an embodiment of the present invention;
FIG. 6 is a drawing for explaining an operation of the second embodiment.

MODE FOR CARRYING OUT THE INVENTION

Figure 2:
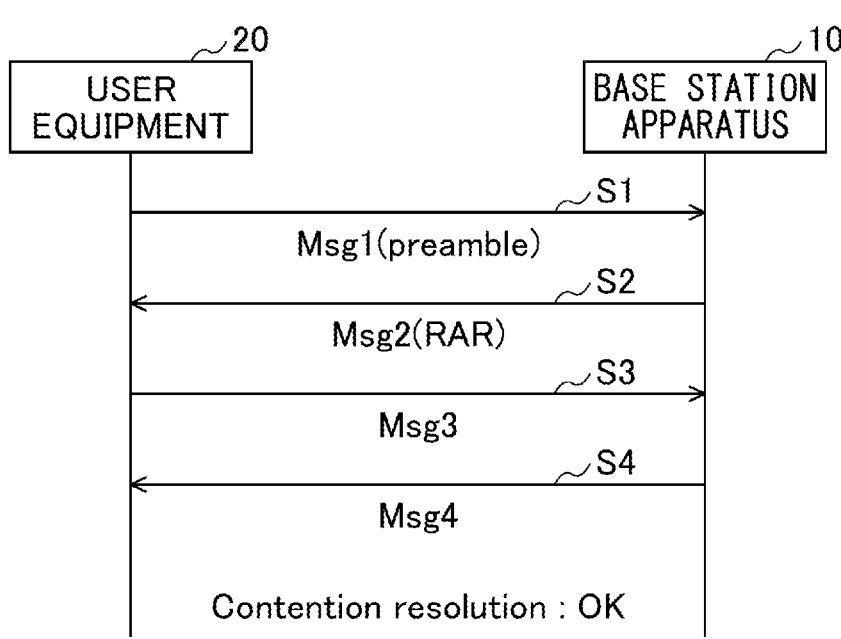
FIG. 2 is a drawing illustrating a four-step RACH.

An embodiment of the present invention will be hereinafter described with reference to drawings. The embodiment described below is an example, and the embodiment to which the present invention is applied is not limited to the following embodiment.

In operation of a wireless communication system according to the embodiment of the present invention, existing techniques are used as appropriate. An example of existing technique includes an existing NR or LTE, but the existing technique is not limited to the existing NR or LTE.

In this specification, terms used in the specifications of NR or LTE, such as PUSCH, PDCCH, RRC, and the like are used, but those expressed by channel names, protocol names, signal names, function names, and the like used in this specification may be referred to as other names.
(System Configuration)

Figure 1:
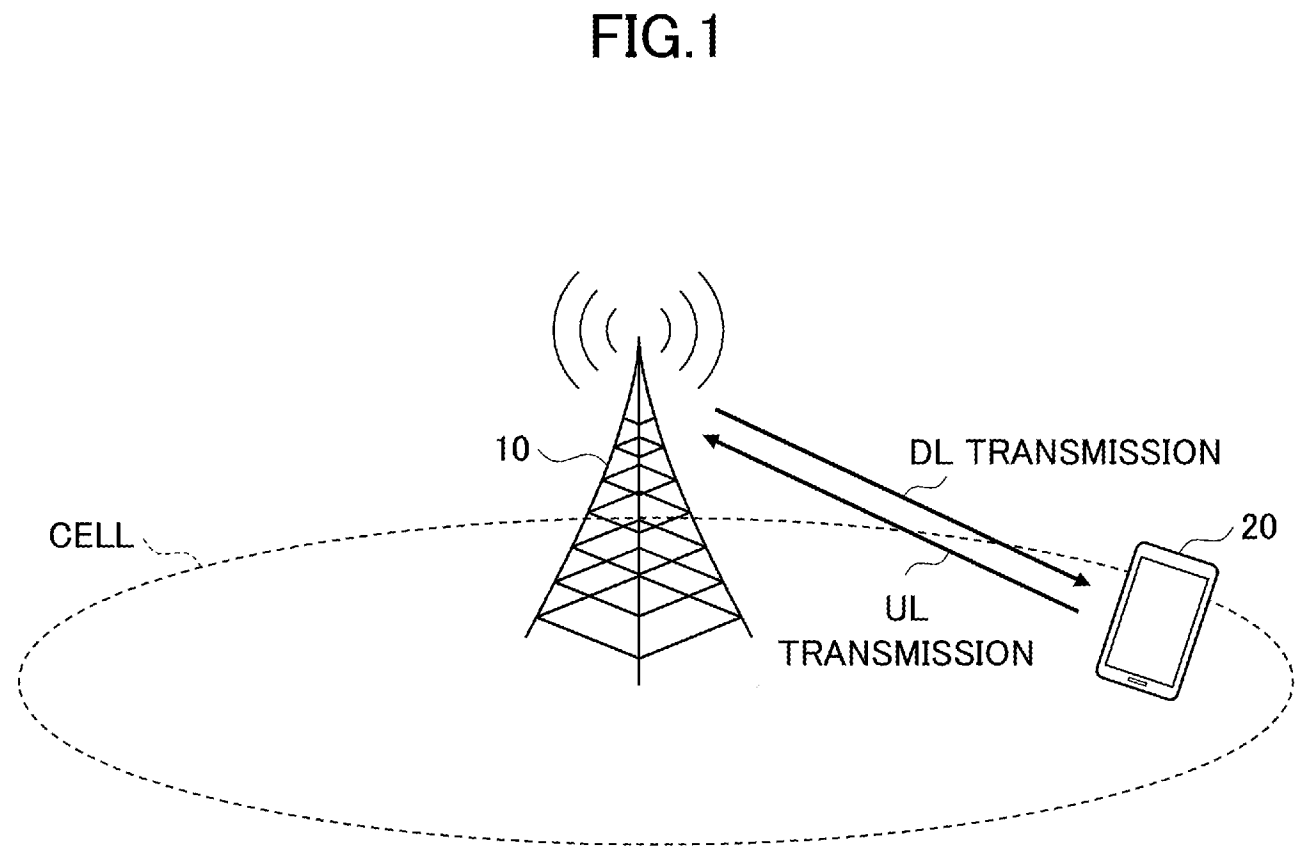

FIG. 1 is a drawing for explaining a wireless communication system according to an embodiment of the present invention. As illustrated in FIG. 1, the wireless communication system according to the embodiment of the present invention includes a base station apparatus 10 and a user equipment 20. In FIG. 1, one base station apparatus 10 and one user equipment 20 are illustrated, but this is only an example. Alternatively, a plurality of base station apparatuses 10 and user equipments 20 may be provided.

The base station apparatus 10 provides one or more cells, and is a communication apparatus wirelessly communicating with the user equipment 20. The physical resource of a radio signal is defined by time domain and frequency domain. Time domain may be defined by OFDM symbol number. Frequency domain may be defined by the number of subcarriers or the number of resource blocks. It should be noted that a TTI (Transmission Time Interval) in the time domain may be a slot, or a TTI may be a subframe.

The base station apparatus 10 transmits a synchronization signal and system information to the user equipment 20. The synchronization signal is, for example, NR-PSS and NR-SSS. The system information is transmitted in, for example, NR-PBCH or PDSCH and is also referred to as broadcast information. As illustrated in FIG. 1, the base station apparatus 10 transmits a control signal or data to the user equipment 20 through DL (Downlink), and receives a control signal or data from the user equipment 20 through UL (Uplink). It should be noted that, here, those transmitted in control channels such as PUCCH, PDCCH, and the like are referred to as control signals, and those transmitted in shared channels such as PUSCH, PDSCH, and the like are referred to as data, but such a way in which the signals are referred to is only an example.

The user equipment 20 is a communication apparatus equipped with a wireless communication function such as a smartphone, a mobile phone, a tablet, a wearable terminal, and a communication module for M2M (Machine-to-Machine). As illustrated in FIG. 1, the user equipment 20 receives control signals or data from the base station apparatus 10 in DL, and transmits control signals or data to the base station apparatus 10 in UL, thereby using various communication services provided by the wireless communication system. It should be noted that the user equipment 20 may be referred to as a UE, and the base station apparatus 10 may be referred to as a gNB.

(Random Access Procedure)

First, an example of a four-step random access procedure executed by a wireless communication system according to the present embodiment will be explained with reference to FIG. 2. In the present embodiment, a CBRA (Contention based Random Access), in which the number of steps is to be reduced, will be explained. In CFRA (Contention Free Random Access), the random access procedure is basically completed when the UE receives Msg2, and therefore, CFRA already has a less number of steps. However, the present invention is not limited to CBRA, and the present invention may be applied to CFRA.

In NR, a random access procedure may be executed by selecting an SS/PBCH block (which may be referred to as an SSB, or may be referred to as a synchronization signal block or a synchronization signal), or a random access procedure may be executed by selecting a CSI-RS (Channel State Information-Reference Signal).

For example, the base station apparatus 10 transmits an SSB (or CSI-RS) for each beam, and the user equipment 20 monitors an SSB (or CSI-RS) of each beam. The user equipment 20 selects, from among a plurality of SSBs (or CSI-RSs), an SSB (or CSI-RS) which is received at a reception power higher than a predetermined threshold, and uses a PRACH resource (PRACH occasion) corresponding to the selected SSB (or CSI-RS) to transmit Message1 (Msg1 (=RA preamble)) (S1 of FIG. 2). Hereinafter, for the sake of convenience, an RA preamble will be referred to as a preamble.

When the base station apparatus 10 detects a preamble, the base station apparatus 10 transmits a Message2 (Msg2 (=RAR)), which is a response thereto, to the user equipment 20 (S2). The user equipment 20 having received Msg2 transmits a Message3 (Msg3) including predetermined information to the base station apparatus 10 (S3).

The base station apparatus 10 having received Msg3 transmits a Message4 (Msg4) to the user equipment 10 (S4). When the user equipment 10 confirms that the predetermined information is included in the Msg4, the user equipment 10 recognizes that the Msg4 is a Msg4 addressed to the user equipment 20 corresponding to the Msg3 (Contention resolution: OK).

Since the above random access procedure includes four steps, the above random access procedure is referred to as a four-step RACH.

Subsequently, a random access procedure having a less number of steps for reducing delay and reducing power consumption will be described with reference to FIG. 3.

In S11, the user equipment 20 transmits MessageA (MsgA) including preamble and data to the base station apparatus 10. For example, in a manner similar to selection of a PRACH resource (PRACH occasion) in four-step RACH, the user equipment 20 selects a PRACH resource and transmits a preamble in the PRACH resource, and transmits data in a PUSCH resource associated with the PRACH resource. It should be noted that the preamble and the data herein correspond to, for example, Msg1 and Msg3 in the four-step RACH. In the two-step RACH, a resource for transmitting data is not limited to resource of PUSCH, and a resource of any channel for transmitting data (or control information) may be used.

In S12, the base station apparatus 10 transmits MessageB (MsgB) to the user equipment 20. The content of MsgB corresponds to, for example, Msg2 and Msg4 in the four-step RACH.

Since the above random access procedure includes two steps, the above random access procedure is referred to as a two-step RACH. The two-step RACH is an example of a random access procedure having a less number of steps.

(Problems)

In two-step RACH, it is expected to reuse NR PRACH preamble design and NR PUSCH specified in Rel-15 as preamble and PUSCH.

In the random access procedure, a value of timing advance is included in a RAR which a user equipment 20 receives from the base station apparatus 20 after the user equipment 20 transmits a preamble. Accordingly, the user equipment 20 can find the value of timing advance and UL synchronization. The timing advance is an amount by which the timing of UL transmission is advanced in view of a propagation delay during UL data transmission and the like. Based on the timing advance, a reception side can perform reception at an appropriate timing.

However, the user equipment 20 is assumed not to know the value of timing advance at the point in time of a preamble transmission, and therefore, a CP (cyclic prefix) length of preamble depends on a cell radius, and in general, it is common to set a longer CP length, as the cell radius becomes larger, in view of a propagation delay. More specifically, at the point in time of a preamble transmission, transmission timing adjustment with timing advance is not performed, it is required to have a sufficient amount of CP length and guard time after the preamble.

Figure 3:
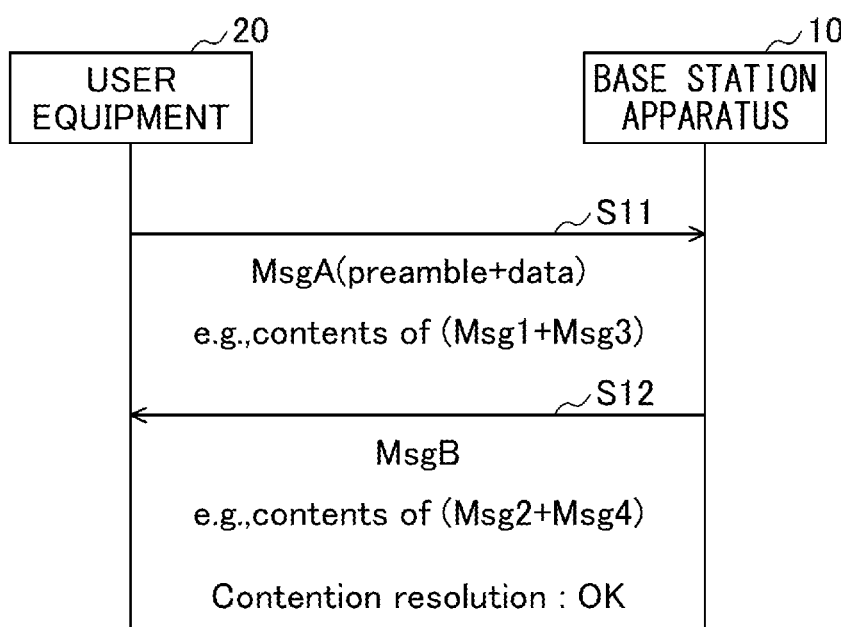
FIG. 3 is a drawing illustrating a two-step RACH.

At the point in time of transmission of MsgA in two-step RACH explained in FIG. 3, during transmission of data in PUSCH transmitted together with the preamble, the user equipment 20 has not received MsgB (including information corresponding to Msg2), and therefore, transmission of data in PUSCH is to be performed without knowing the value of timing advance just like the preamble.

A PUSCH used for transmission of MsgA, NR PUSCH is reused, and therefore, a new CP length of PUSCH of MsgA is not expected. Therefore, the CP length of PUSCH is extremely shorter than the CP length of a preamble, it is not expected to specify a new longer CP length for PUSCH for MsgA in addition to the short CP length. Therefore, when the distance between the user equipment 20 and the base station apparatus 10 is long, the CP length of PUSCH cannot cover a propagation delay and a delay spread. Therefore, the distance between the user equipment 20 and the base station apparatus 10 in which two-step RACH can be used is limited to a short distance.

In that case, when two-step RACH is enabled only in a cell having a maximum cell radius equal to or less than the distance in which two-step RACH can be used, cases where two-step RACH can be used is greatly limited. For this reason, it is necessary to have a mechanism for carrying out two-step RACH upon determining that two-step RACH can be carried out.

Hereinafter, as techniques for solving the above problems, a first embodiment, a second embodiment, a third embodiment, and a fourth embodiment will be explained.

First Embodiment

In the first embodiment, the base station apparatus 10 notifies the user equipment 20 whether the user equipment 20 executes two-step RACH or four-step RACH when performing random access procedure. A signal used for notification may be an RRC signal, a MAC signal, a signal (DCI, PDCCH) of a physical layer, or other signals. In a case where, e.g., the cell radius is small, the base station apparatus 10 may notify within a cell that two-step RACH is executed, through broadcast information common to all the camping user equipments. Alternatively, the base station apparatus 10 may notify whether two-step RACH is executed or four-step RACH is executed, through a signal for triggering RACH (RRC, PDCCH, and the like).

The user equipment 20 executes two-step RACH or four-step RACH when performing a random access procedure according to an instruction given by the base station apparatus 10.

Figure 4:
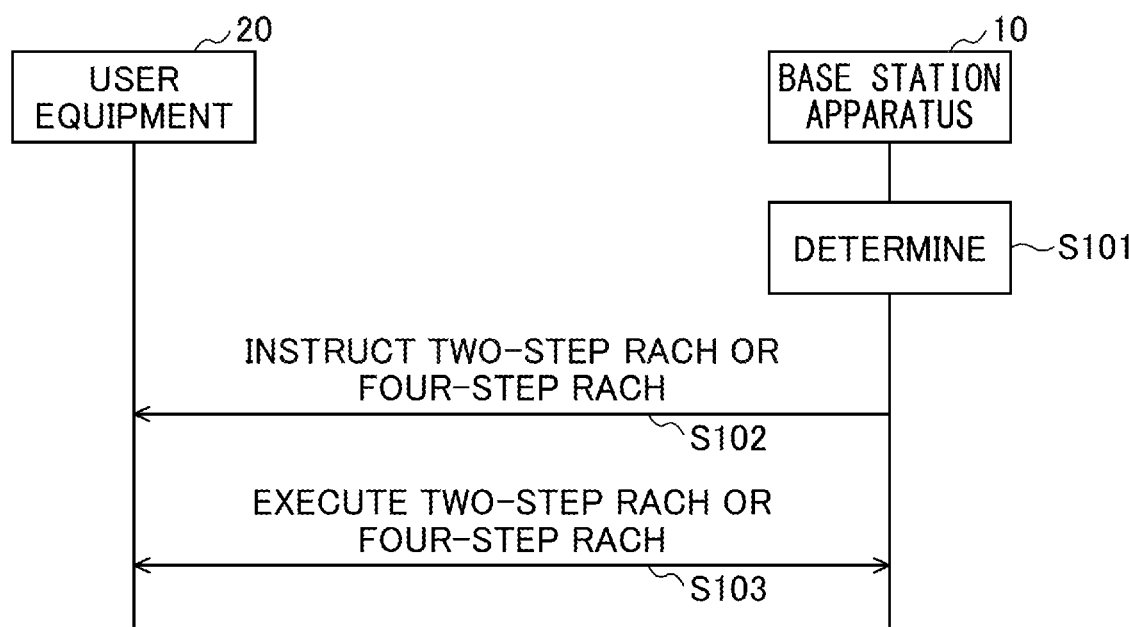
FIG. 4 is a drawing for explaining an operation of a first embodiment.

FIG. 4 illustrates an example of the processing sequence of the first embodiment. First, in step S101, the base station apparatus 10 determines whether the user equipment 20 is to execute two-step RACH or four-step RACH.

For example, the base station apparatus 10 finds that the user equipment 20 needs to re-establish uplink synchronization and execute CBRA, and further, finds, from the previous communication with the user equipment 20, that the user equipment 20 is located at a distance where two-step RACH can be performed, then the base station apparatus 10 determines to cause the user equipment 20 to execute two-step RACH.

In S102, the base station apparatus 10 instructs the user equipment 20 as to a method of random access procedure (two-step RACH or four-step RACH) on the basis of the determination of S101, and in S103, the user equipment 20 executes two-step RACH or four-step RACH on the basis of the instruction given by the base station apparatus 10 when executing the random access procedure.

In the first embodiment, the base station apparatus 10 notifies the user equipment 20 that two-step RACH is executed or four-step RACH is executed, and the user equipment 20 executes random access procedure on the basis of the notification, and therefore, the user equipment 20 can determine quickly whether to execute two-step RACH or to execute four-step RACH, with less load in determination processing.

Second Embodiment

In the second embodiment, the user equipment 20 determines whether to execute two-step RACH or to execute four-step RACH on the basis of a predetermined reference value. The predetermined reference value is, for example, a threshold value. Also, the predetermined reference value is, for example, notified from the base station apparatus 10 to the user equipment 20.

Figure 5:
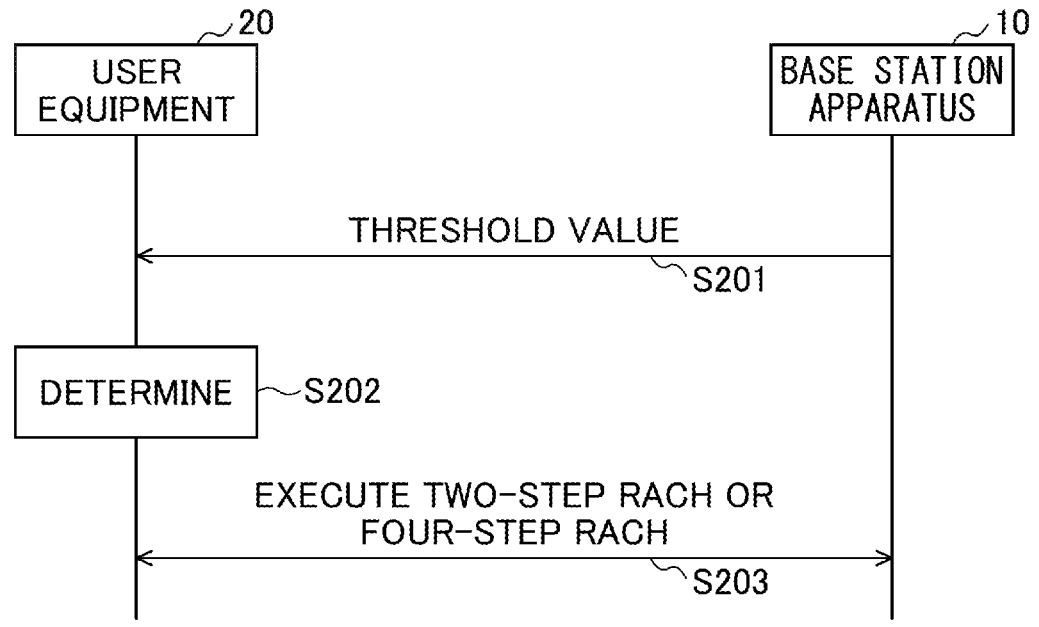
FIG. 5 is a drawing for explaining an operation of a second embodiment.

FIG. 5 illustrates an example of processing sequence in the second embodiment. In step S201, the base station apparatus 10 notifies a threshold value to the user equipment 20. The threshold value may be a value common to the cell, or may be a value unique to each user equipment. A signal used for notification in step S201 may be an RRC signal, a MAC signal, and other signals. The user equipment 20 holds a received threshold value.

In step S202, for example, when a trigger for executing a random access (for example, uplink synchronization establishment) occurs in the user equipment 20, the user equipment 20 uses the threshold value received in step S201 to determine whether to execute two-step RACH or to execute four-step RACH. In S203, on the basis of the determination result in S202, the user equipment 20 executes two-step RACH or four-step RACH. It should be noted that the determination in S202 may be performed before a trigger for executing a random access occurs.

As specific examples of the second embodiment, Option 1 and Option 2 will be hereinafter explained.
<Option 1>

In Option 1, in step S201, a threshold value to be compared with a measurement result of a DL signal by the user equipment 20 is notified from the base station apparatus 10 to the user equipment 20. The measurement result is, for example, any one of RSRP, RSRQ, and SINR. It should be noted that a DL signal to be measured may be SS, may be CSI-RS, or may be other signals.

In step S202, the user equipment 20 compares the threshold value with a measurement result at a point in time when (or before) a trigger of a random access procedure occurs, and when the measurement result is greater than the threshold value, the user equipment 20 determines to execute two-step RACH, and when the measurement result is less than the threshold value, the user equipment 20 determines to execute four-step RACH. The measurement result to be compared with the threshold value may be a measurement result for a single time, may be a statistical value (for example, an average) of measurement results in a certain duration, or may be a variation of measurement results in a certain duration.

Figure 6:
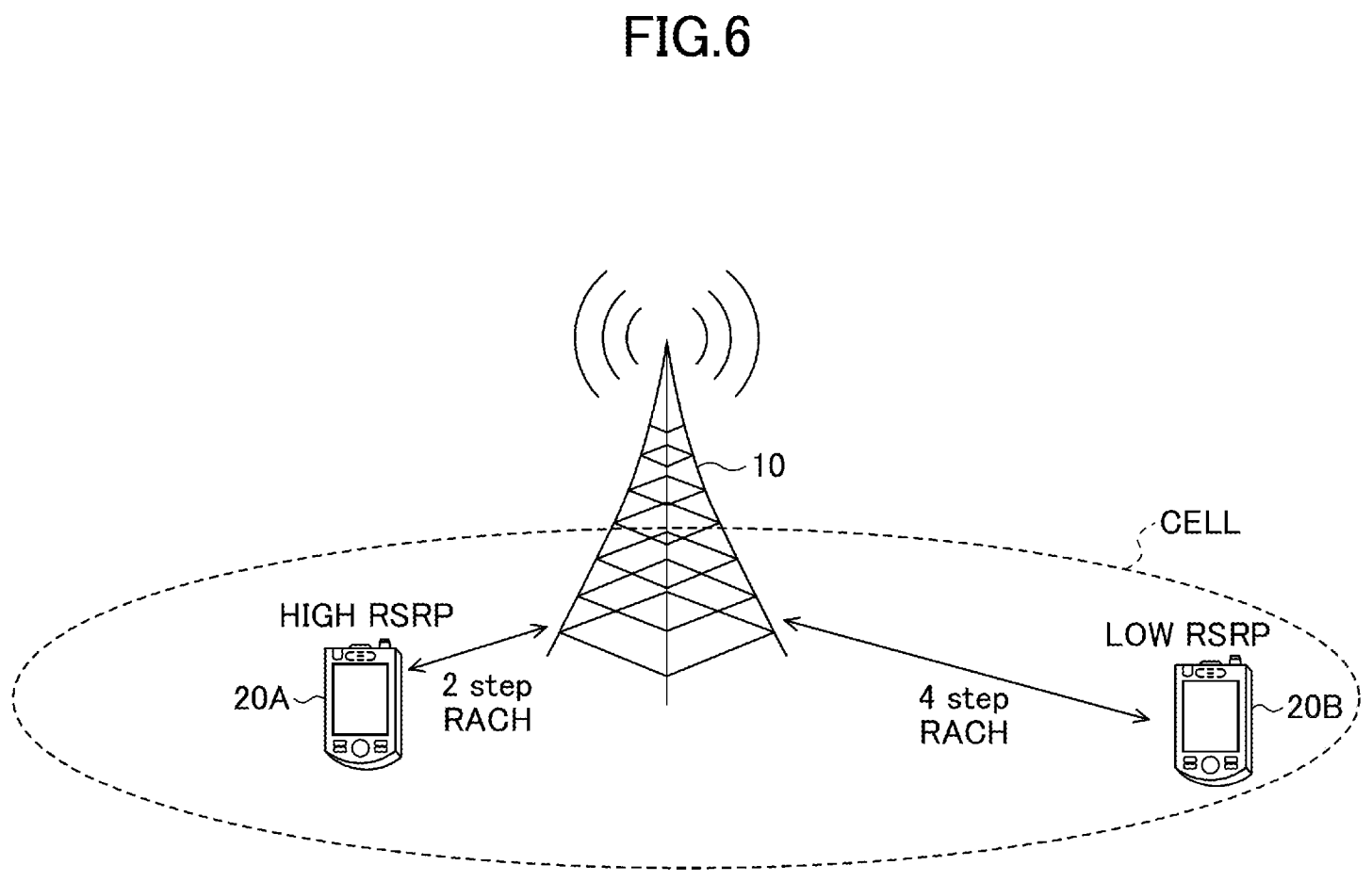

FIG. 6 illustrates an image of Option 1. As illustrated in FIG. 6, a user equipment 20A is located at a distance close to the base station apparatus 10, and accordingly, an RSRP is higher than the threshold value, and the user equipment 20A executes two-step RACH. Conversely, a user equipment 20B is located at a distance far from the base station apparatus 10, and accordingly, an RSRP is lower than the threshold value, and the user equipment 20 executes four-step RACH.
<Option 2>

In Option 2, in S201, a threshold value to be compared with a value of timing advance held by the user equipment 20 is notified from the base station apparatus 10 to the user equipment 20. Normally, when the distance between the base station apparatus 10 and the user equipment 20 increases, the value of timing advance increases, and when the distance between the base station apparatus 10 and the user equipment 20 decreases, the value of timing advance decreases.

In step S202, the user equipment 20 compares the threshold value with the value of timing advance held at a point in time when (or before) a trigger of a random access procedure occurs. When the value of timing advance is less than the threshold value, the user equipment 20 determines to execute two-step RACH, and when the value of timing advance is more than the threshold value, the user equipment 20 determines to execute four-step RACH.

The value of timing advance held by the user equipment 20 may be, for example, a value of timing advance included in an RAR received in a random access procedure executed immediately before S202. Alternatively, the value of timing advance held by the user equipment 20 may be, for example, a value obtained by applying a correction according to a timing advance command in a MAC CE to the value of timing advance included in the RAR received in the random access procedure executed immediately before S202.

It should be noted that a threshold value to be compared with the value of timing advance may be notified from the base station apparatus 10 to the user equipment 20 as illustrated in FIG. 5, or may be specified in specifications (standards). In a case where the threshold value is specified in specifications (standards), the user equipment 20 may hold the threshold value in advance (embedded in the product), or the threshold value may be notified from the base station apparatus 10 to the user equipment 20.

Without using the threshold value described above, the user equipment 20 may make determination on the basis of the CP length of PUSCH used for transmission of MsgA. For example, in a case where the CP length is a length corresponding to a distance D, the user equipment 20 executes four-step RACH in a case where the distance corresponding to the value of timing advance held by the user equipment 20 is more than the distance D, and the user equipment 20 executes two-step RACH in a case where the distance corresponding to the value of timing advance held by the user equipment 20 is less than the distance D.

In the second embodiment, the user equipment 20 determines the method of random access procedure by comparing a threshold value and a value according to a distance between the base station apparatus 10 and the user equipment 20, and therefore, the method of the random access procedure can be appropriately determined.

Third Embodiment

The base station apparatus 10 applies different transmission beam formings to respective SSBs (SS Blocks) and transmits the SSBs (SS Blocks). A number (index) is attached to each SSB. Each SSB is periodically transmitted at a preconfigured symbol position. Since a single block is constituted by an SS (Synchronization Signal) and PBCH, the SSB explained in the present specification may be referred to as an SS/PBCH block.

Figure 7:
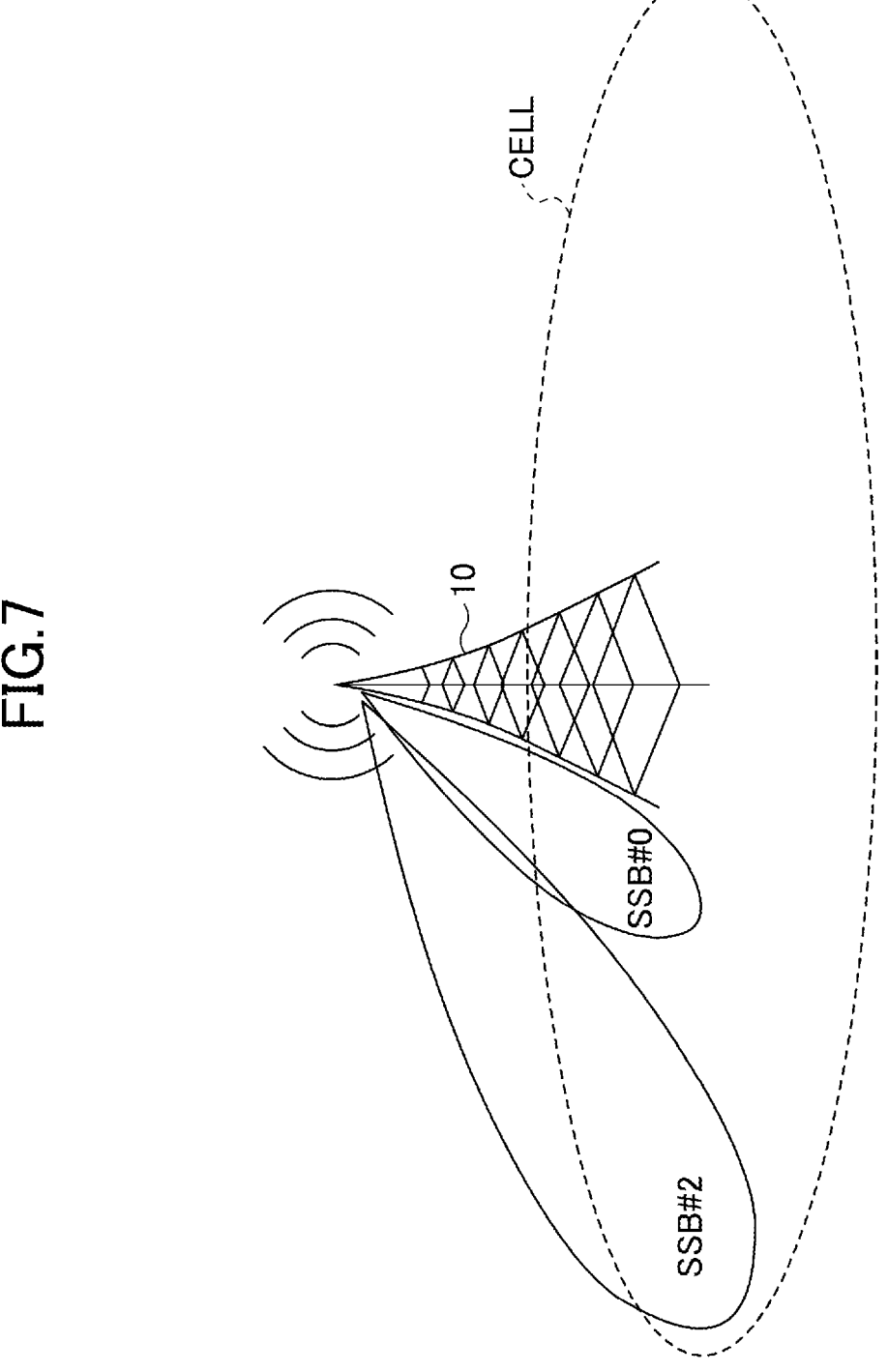
FIG. 7 is a drawing for explaining an operation of a third embodiment.

For example, as illustrated in FIG. 7, the base station apparatus 10 transmits an SSB #0 with a beam oriented toward a location close to the base station apparatus 10, and transmits an SSB #2 with a beam oriented toward a location far from the base station apparatus 10.

In the random access procedure, the user equipment 20 selects an SSB with a received power higher than a predetermined threshold value, selects a RACH occasion (preamble resource) corresponding to the SSB, and transmits the preamble with the preamble resource. It should be noted that this operation may also be performed in two-step RACH, or an operation different from this operation may be performed in two-step RACH.

In the third embodiment, in accordance with the SSB selected before the preamble transmission, the user equipment 20 determines whether two-step RACH is adopted or four-step RACH is adopted. The base station apparatus 10 notifies the user equipment 20 of an SSB index corresponding to two-step RACH and an SSB index corresponding to four-step RACH. However, in cases such as a case where an SSB index corresponding to two-step RACH and an SSB index corresponding to four-step RACH are preconfigured in the user equipment 20 (e.g., specified in the specification), this notification may not be performed.

For example, in a case where SSB #0, SSB #1 correspond to two-step RACH, and SSB #2, SSB #4 correspond to four-step RACH, if the user equipment 20 selects an SSB #0 before the preamble transmission, the user equipment 20 executes two-step RACH.

Figure 8:
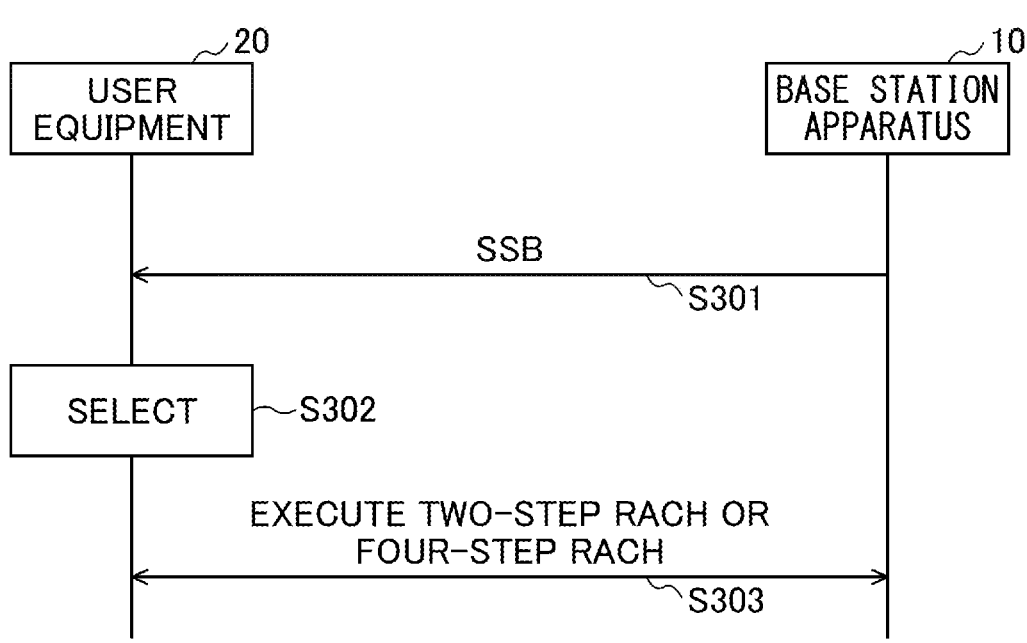
FIG. 8 is a drawing for explaining an operation of the third embodiment.

FIG. 8 illustrates an example of a processing sequence according to the third embodiment. As illustrated in FIG. 8, the user equipment 20 receives an SSB (S301). In S302, the user equipment 20 selects a particular SSB. In S303, the user equipment 20 executes a random access procedure according to a method corresponding to the selected SSB.

The third embodiment has been explained using SSB as an example, but the processing of the above third embodiment can be carried out even when CSI-RS is used instead of SSB.

In the third embodiment, the user equipment 20 determines the method of the random access procedure in accordance with the received SSB (CSI-RS), and therefore, the method of the random access procedure can be appropriately determined.

Fourth Embodiment

In the fourth embodiment, a technique that can be applied to any one of the first to third embodiments explained above will be explained.

In a case where whether two-step RACH is executed or four-step RACH is executed is determined according to the determination of the user equipment 20, the base station apparatus 10 is preferably capable of finding which of two-step RACH or four-step RACH is executed by the user equipment 20, on the basis of a signal received from the user equipment 20 (for example, a preamble).

Therefore, in the fourth embodiment, the base station apparatus 10 separately notifies, to the user equipment 20, configuration (configuration information) for two-step RACH and configuration for four-step RACH. However, it is not necessary to completely separately notify the configurations, and only a part of configuration may be notified separately. The notification may be given by an RRC signal, or may be given by a MAC signal.

For example, the base station apparatus 10 may notify, to the user equipment 20, a preamble resource A as a preamble resource for two-step RACH (RACH occasion) and a preamble resource B as a preamble resource for four-step RACH (RACH occasion).

The preamble resource A and the preamble resource B are resources that do not overlap each other. In this case, in a case where the base station apparatus 10 receives a preamble from the user equipment 20 through a preamble resource A, the base station apparatus 10 determines that the user equipment 20 executes two-step RACH. Conversely, in a case where the base station apparatus 10 receives a preamble from the user equipment 20 through a preamble resource B, the base station apparatus 10 determines that the user equipment 20 executes four-step RACH.

For example, the base station apparatus 10 notifies, to the user equipment 20, a preamble index-A (or a preamble index set-A) as a preamble index for two-step RACH (or preamble index set), and a preamble index-B (or a preamble index set-B) as a preamble index for four-step RACH (or a preamble index set).

The preamble index-A (or preamble index set-A) and the preamble index-B (or preamble index set-B) are preambles that do not overlap each other. In this case, in a case where the base station apparatus 10 receives a preamble of a preamble index-A (or an index in the preamble index set-A) from the user equipment 20, the base station apparatus 10 determines that the user equipment 20 executes two-step RACH. In a case where the base station apparatus 10 receives a preamble of a preamble index-B (or an index in the preamble index set-B) from the user equipment 20, the base station apparatus 10 determines that the user equipment 20 executes four-step RACH.

In the fourth embodiment, since a configuration for two-step RACH and a configuration for four-step RACH are distinguished from each other, the base station apparatus 10 can quickly determine which of two-step RACH or four-step RACH the user equipment 20 is executing.

<Apparatus Configuration>

Next, an example of functional configuration of the base station apparatus 10 and the user equipment 20 that execute the processing and operations described so far will be described. The base station apparatus 10 and the user equipment 20 include a function for implementing the first to fourth embodiments explained above. However, each of the base station apparatus 10 and the user equipment 20 may have only the functions of any one of the first to fourth embodiments.

<Base Station Apparatus 10>

Figure 9:
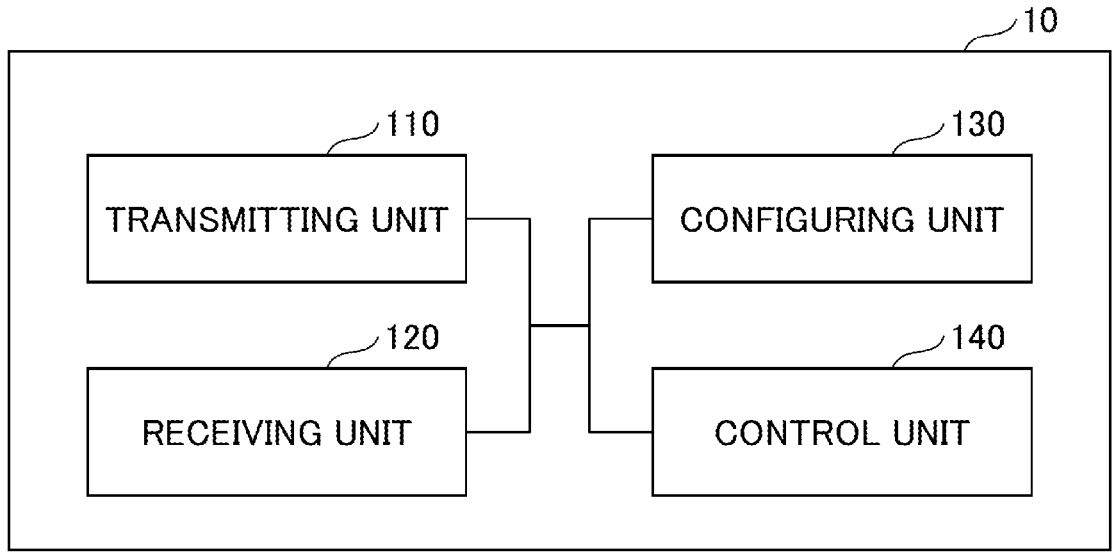
FIG. 9 is a drawing illustrating an example of a functional configuration of a base station apparatus 10 according to an embodiment of the present invention.

FIG. 9 is a drawing illustrating an example of a functional configuration of the base station apparatus 10. As illustrated in FIG. 9, the base station apparatus 10 includes a transmitting unit 110, a receiving unit 120, a configuring unit 130, and a control unit 140. The functional configuration illustrated in FIG. 9 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. The receiving unit 120 includes a function of receiving various types of signals transmitted from the user equipment 20 and acquiring, for example, information on a higher layer from the received signals. Further, the transmitting unit 110 has a function of transmitting NR-PSS, NR-SSS, NR-PBCH, a DL/UL control signal, a DL data or the like to the user equipment 20.

The configuring unit 130 stores configuration information configured in advance and various configuration information to be transmitted to the user equipment 20 in a storage device and reads out the configuration information from the storage device as needed. The contents of the configuration information are, for example, a reference value (for example, threshold value), preamble resource, PUSCH resource, RAR window length, and the like used for random access procedure.

For example, when the control unit 140 finds that the user equipment 20 executes CBRA, and further, finds, from a previous communication with the user equipment 20, that the user equipment 20 is located at a distance at which two-step RACH can be performed, the control unit 140 determines to cause the user equipment 20 to execute two-step RACH. A functional unit configured to transmit signals in the control unit 140 may be included in the transmitting unit 110, and a functional unit configured to receive signals in the control unit 140 may be included in the receiving unit 120.

<User Equipment 20>

Figure 10:
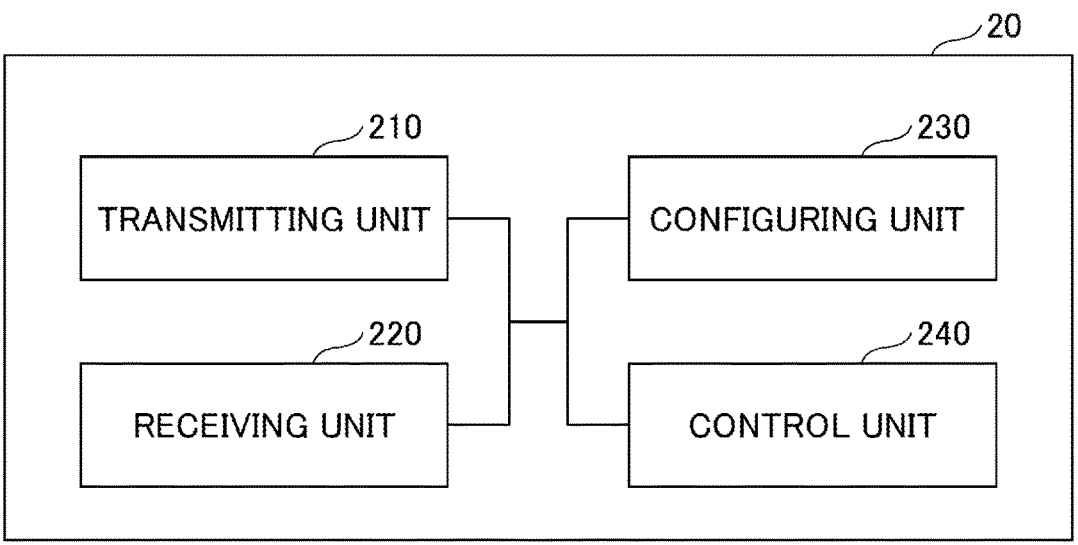
FIG. 10 is a drawing illustrating an example of a functional configuration of a user equipment 20 according to an embodiment of the present invention.

FIG. 10 is a drawing illustrating an example of a functional configuration of the user equipment 20. As illustrated in FIG. 10, the user equipment 20 includes a transmitting unit 210, a receiving unit 220, a configuring unit 230, and a control unit 240. The functional configuration illustrated in FIG. 10 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also the receiving unit 220 measures a DL signal.

The configuring unit 230 stores in a storage device various types of configuration information received from the base station apparatus 10 by the receiving unit 220 and reads out the configuration information from the storage device as needed. The configuring unit 230 also stores configuration information configured in advance. The contents of the configuration information are, for example, a reference value (for example, threshold value), preamble resource, PUSCH resource, RAR window length, and the like used for random access procedure.

As explained in the first to third embodiments and the like, the control unit 240 determines whether to execute two-step RACH. A functional unit configured to transmit signals in the control unit 240 may be included in the transmitting unit 210, and a functional unit configured to receive signals in the control unit 240 may be included in the receiving unit 220.

<Hardware Configuration>

The block diagrams (FIGS. 9 and 10) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 11:
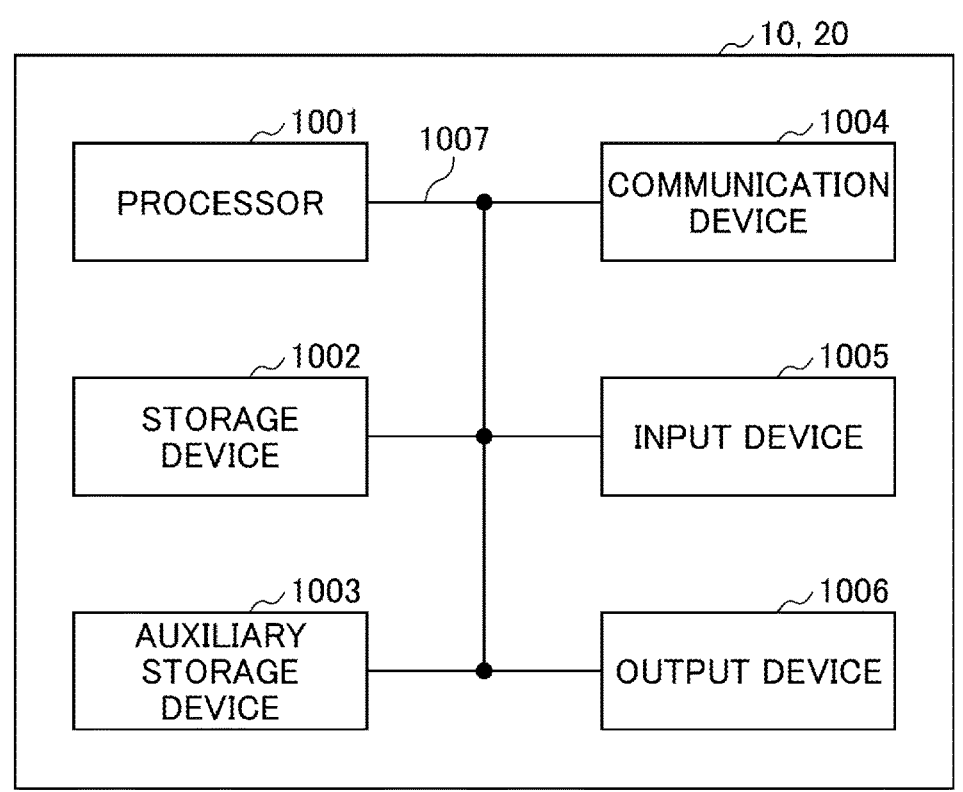
FIG. 11 is a drawing illustrating an example of a hardware configuration of a base station apparatus 10 or a user equipment 20 according to an embodiment of the present invention.

For example, the base station apparatus 10, the user equipment 20, and the like according to one embodiment of the present disclosure may function as a computer that performs processing of a wireless communication according to the present disclosure. FIG. 11 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 9, may be implemented by a control program that is stored in the storage device 1002 and that is executed by the processor 1001. Also, for example, the control unit 240 of the user equipment 20, as illustrated in FIG. 10, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiment

As explained hereinabove, this specification discloses a user equipment and a control method described at least in each of the following items.
(First Item)
A user equipment including:
a receiving unit configured to receive, from a base station apparatus, an instruction designating a method in which a random access procedure is performed; and
a control unit configured to determine, in accordance with the instruction, whether to execute a random access procedure of a method in which a first message is transmitted using a preamble resource and a PUSCH resource.

(Second Item)

A user equipment including:

a receiving unit configured to measure a DL signal; and a control unit configured to determine, by comparing a measurement result of the measurement and a predetermined threshold value, whether to execute a random access procedure of a method in which a first message is transmitted using a preamble resource and a PUSCH resource.

(Third Item)

A user equipment comprising:

a receiving unit configured to receive a value of timing advance from a base station apparatus; and a control unit configured to determine, by comparing the value of the timing advance and a predetermined threshold value, whether to execute a random access procedure of a method in which a first message is transmitted using a preamble resource and a PUSCH resource.

(Fourth Item)

A user equipment comprising:

a receiving unit configured to select a particular signal from a plurality of signals transmitted from a base station apparatus and each being associated with an index; and a control unit configured to determine, on the basis of the index of the particular signal, whether to execute a random access procedure of a method in which a first message is transmitted using a preamble resource and a PUSCH resource.

According to each of the techniques of the first to fourth items explained above, the user equipment can determine, without relying on a cell radius, whether to execute a random access procedure having a less number of steps.

(Fifth Item)

The user equipment according to any one of the first to fourth items, wherein the receiving unit separately receives configuration information about the random access procedure of the method in which the first message is transmitted using the preamble resource and the PUSCH resource, and configuration information about a random access procedure of another method.

According to the technique of the fifth item, the base station apparatus can quickly determine which of two-step RACH or four-step RACH the user equipment is executing.

(Sixth Item)

A control method executed by a user equipment, including:

receiving an instruction of a method of a procedure; and determining, in accordance with the instruction, whether to execute a random access procedure of a method in which a first message is transmitted using a preamble resource and a PUSCH resource.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user equipment according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST

10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:

a receiver configured to receive configuration information on a random access procedure; and a processor configured to execute a two-step random access procedure when the configuration information includes information explicitly indicating the two-step random access procedure, and to execute a four-step random access procedure when the configuration information includes information explicitly indicating the four-step random access procedure, wherein the receiver receives, from a base station, the configuration information relating to a number of synchronization signal blocks (SSBs) for the two-step random access procedure and the configuration information relating to a number of SSBs for the four-step random access procedure separately, wherein the processor is configured to determine whether to execute the two-step random access procedure or to execute the four-step random access procedure in accordance with determining that the configuration information relates to which one of the number of SSBs for the two-step random access procedure or the number of SSBs for the four-step random access procedure, wherein the processor determines to execute the two-step random access procedure in response to a Reference Signal Received Power (RSRP) measurement result of a DL signal being above a threshold and to execute the four-step random access procedure in response to the RSRP measurement result of the DL signal being below the threshold, and wherein the configuration information for the two-step random access procedure includes a preamble index set for the two-step random access procedure, and the configuration information for the four-step random access procedure includes a preamble index set for the four-step random access procedure.

2. The terminal as claimed in claim 1, wherein the configuration information for the two-step random access procedure includes a PRACH occasion for the two-step random access procedure, and the configuration information for the four-step random access procedure includes a PRACH occasion for the four-step random access procedure.

3. A communication method executed by a terminal, comprising:

receiving configuration information on a random access procedure;

executing a two-step random access procedure when the configuration information includes information explicitly indicating the two-step random access procedure, and executing a four-step random access procedure when the configuration information includes information explicitly indicating the four-step random access procedure, wherein the terminal receives, from a base station, the configuration information relating to a number of synchronization signal blocks (SSBs) for the two-step random access procedure and the configuration information relating to a number of SSBs for the four-step random access procedure separately;

determining whether to execute the two-step random access procedure or to execute the four-step random access procedure in accordance with determining that the configuration information relates to which one of the number of SSBs for the two-step random access procedure or the number of SSBs for the four-step random access procedure; and determining to execute the two-step random access procedure in response to a Reference Signal Received Power (RSRP) measurement result of a DL signal being above a threshold and to execute the four-step random access procedure in response to the RSRP measurement result of the DL signal being below the threshold, wherein the configuration information for the two-step random access procedure includes a preamble index set for the two-step random access procedure, and the configuration information for the four-step random access procedure includes a preamble index set for the four-step random access procedure.

4. A base station comprising:

a transmitter configured to transmit configuration information on a random access procedure; and a processor configured to execute a two-step random access procedure when the configuration information includes information explicitly indicating the two-step random access procedure, and to execute a four-step random access procedure when the configuration information includes information explicitly indicating the four-step random access procedure, wherein the transmitter transmits, to the terminal, the configuration information relating to a number of synchronization signal blocks (SSBs) for the two-step random access procedure and the configuration information relating to a number of SSBs for the four-step random access procedure separately, wherein the processor configures the terminal to determine whether to execute the two-step random access procedure or to execute the four-step random access procedure in accordance with the configuration information being related to which one of the number of SSBs for the two-step random access procedure or the number of SSBs for the four-step random access procedure, wherein the processor configures the terminal to execute the two-step random access procedure in response to a Reference Signal Received Power (RSRP) measurement result of a DL signal being above a threshold and to execute the four-step random access procedure in response to the RSRP measurement result of the DL signal being below the threshold, and wherein the configuration information for the two-step random access procedure includes a preamble index set for the two-step random access procedure, and the configuration information for the four-step random access procedure includes a preamble index set for the four-step random access procedure.

5. A communication system comprising a base station and a terminal, the base station comprising:

a transmitter configured to transmit configuration information on a random access procedure; and a processor configured to execute a two-step random access procedure when the configuration information includes information explicitly indicating the two-step random access procedure, and to execute a four-step random access procedure when the configuration information includes information explicitly indicating the four-step random access procedure, and the terminal comprising:

a receiver configured to receive the configuration information on a random access procedure; and a processor configured to execute a two-step random access procedure when the configuration information includes information explicitly indicating the two-step random access procedure, and to execute a four-step random access procedure when the configuration information includes information explicitly indicating the four-step random access procedure, wherein the receiver receives, from the base station, the configuration information relating to a number of synchronization signal blocks (SSBs) for the two-step random access procedure and the configuration information relating to a number of SSBs for the four-step random access procedure separately, wherein the processor of the terminal is configured to determine whether to execute the two-step random access procedure or to execute the four-step random access procedure in accordance with determining that the configuration information relates to which one of the number of SSBs for the two-step random access procedure or the number of SSBs for the four-step random access procedure, wherein the processor of the terminal determines to execute the two-step random access procedure in response to a Reference Signal Received Power (RSRP) measurement result of a DL signal being above a threshold and to execute the four-step random access procedure in response to the RSRP measurement result of the DL signal being below the threshold, and wherein the configuration information for the two-step random access procedure includes a preamble index set for the two-step random access procedure, and the configuration information for the four-step random access procedure includes a preamble index set
for the four-step random access procedure.

* * * * *